United States Patent
Himeno et al.

(10) Patent No.: US 8,659,850 B2
(45) Date of Patent: Feb. 25, 2014

(54) BRUSHLESS MOTOR, DISK DRIVE APPARATUS, AND METHOD OF MANUFACTURING THE BRUSHLESS MOTOR

(71) Applicant: Nidec Corporation, Kyoto (JP)

(72) Inventors: Toshikazu Himeno, Kyoto (JP); Hongbing Du, Singapore (SG); Junichi Hashimoto, Kyoto (JP); Kazuya Enokizono, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/780,327

(22) Filed: Feb. 28, 2013

(65) Prior Publication Data
US 2013/0258522 A1 Oct. 3, 2013

(30) Foreign Application Priority Data

Mar. 30, 2012 (SG) ................ 201202346-1

(51) Int. Cl.
*G11B 17/028* (2006.01)
*H02K 7/08* (2006.01)

(52) U.S. Cl.
USPC ........................................ 360/99.08; 310/90

(58) Field of Classification Search
USPC .......... 360/98.07, 99.04, 99.08; 310/90, 67 R
See application file for complete search history.

(56) References Cited

U.S. PATENT DOCUMENTS

| | | | | |
|---|---|---|---|---|
| 5,450,261 A | * | 9/1995 | Ishizuka | 360/99.12 |
| 5,519,270 A | * | 5/1996 | Yamada et al. | 310/67 R |
| 5,638,233 A | * | 6/1997 | Ishizuka | 360/99.09 |
| 6,445,096 B1 | | 9/2002 | Saito et al. | |
| 6,801,388 B2 | | 10/2004 | Kayama et al. | |
| 7,663,280 B2 | * | 2/2010 | Miyamori et al. | 310/90 |
| 8,176,920 B2 | | 5/2012 | Young | |
| 2010/0259121 A1 | * | 10/2010 | Ueda et al. | 310/103 |

FOREIGN PATENT DOCUMENTS

JP 2005-348572 A 12/2005
SG 135981 A1 10/2007

OTHER PUBLICATIONS

Himeno et al., U.S. Appl. No. 13/856,055, filed Apr. 3, 2013.
Sumi et al., U.S. Appl. No. 13/867,860, filed Jan. 31, 2013.
Himeno et al., U.S. Appl. No. 13/867,505, filed Apr. 22, 2013.
Himeno et al., Singapore Patent Application No. 201202345-3; filed on Mar. 30, 2012.

* cited by examiner

*Primary Examiner* — Angel Castro
(74) *Attorney, Agent, or Firm* — Westerman, Hattori, Daniels & Adrian, LLP

(57) ABSTRACT

A stationary unit of a brushless motor includes a flat armature and a base member arranged to support the armature. The armature includes a power supply portion to which a lead wire is connected. The base member includes a wall portion and a window portion. The wall portion is radially opposed to an outer edge portion of the armature. The window portion is positioned below the power supply portion to axially extend through the base member. An adhesive agent exists between the wall portion and the outer edge portion of the armature. Accordingly, the base member and the armature are strongly fixed to each other. Further, a sealing material is interposed between a whole periphery of an edge of the window portion and the armature, so that the window portion is sealed.

20 Claims, 15 Drawing Sheets

BRUSHLESS MOTOR, DISK DRIVE APPARATUS, AND METHOD OF MANUFACTURING THE BRUSHLESS MOTOR

FIELD

The present invention relates to a brushless motor, a disk drive apparatus and a method of manufacturing the brushless motor.

BACKGROUND

A hard disk device is equipped with a brushless motor for rotating a disk. A conventional brushless motor is disclosed in, e.g., SG185981. A permanent-magnet synchronous motor of SG185981 includes a permanent magnet mounted to at least one of a top yoke and a bottom yoke and an armature arranged within an air gap between the permanent magnet and the other yoke.

In a so-called axial-gap-type motor in which an armature and a permanent magnet are axially opposed to each other, it is sometimes the case that a coil and an electronic circuit for supplying a drive current to the coil are formed in a single circuit board. In this case, it is required that the circuit board be firmly fixed to a base in order to accurately maintain the axial distance between the coil and the permanent magnet.

SUMMARY

A brushless motor in accordance with an illustrative first invention of the subject application includes a stationary unit and a rotary unit rotatably supported with respect to the stationary unit. The stationary unit includes a flat armature extending in a direction orthogonal to a vertically-extending center axis and a base member arranged to support the armature. The rotary unit includes a magnet positioned above the armature and a magnetic rotor yoke positioned below the armature. The armature includes a power supply portion to which a lead wire is connected. The base member includes a wall portion radially opposed to an outer edge portion of the armature and a window portion positioned below the power supply portion to axially extend through the base member. An adhesive agent exists between the wall portion and the outer edge portion of the armature. A sealing material is interposed between a whole periphery of an edge of the window portion and the armature.

With the illustrative first invention of the subject application, the base member and the armature are strongly fixed to each other because the adhesive agent is interposed between the wall portion and the armature. In addition, the window portion is sealed because the sealing material is interposed between the periphery of the window portion and the armature.

A brushless motor in accordance with an illustrative second invention of the subject application includes: a flat armature extending in a direction orthogonal to a vertically-extending center axis; a base member including a wall portion radially opposed to an outer edge portion of the armature, an annular surface extending radially inward from a lower end of the wall portion and a tapering surface extending radially inward and downward from a radial inner end of the annular surface; and a magnetic rotor yoke positioned below the armature.

The brushless motor in accordance with the illustrative second invention includes a manufacturing method comprising the steps of: (a) applying an adhesive agent on the wall portion or the outer edge portion of the armature; and (b) arranging the armature radially inward of the wall portion and above the annular surface.

With the illustrative second invention of the subject application, the base member and the armature are strongly fixed to each other because the adhesive agent is interposed between the wall portion and the armature. In addition, it is possible to restrain the uncured adhesive agent from overflowing radially inward beyond the tapering surface. Accordingly, it is possible to restrain the adhesive agent from making contact with the rotor yoke.

A brushless motor in accordance with an illustrative third invention of the subject application includes: a flat armature extending in a direction orthogonal to a vertically-extending center axis; a base member including a wall portion radially opposed to an outer edge portion of the armature, an annular surface extending radially inward from a lower end of the wall portion and a groove portion provided on the annular surface; and a magnetic rotor yoke positioned below the armature.

The brushless motor in accordance with the illustrative third invention includes a manufacturing method comprising the steps of: (a) applying an adhesive agent on the wall portion or the outer edge portion of the armature; and (b) arranging the armature radially inward of the wall portion and above the annular surface.

With the illustrative third invention of the subject application, the base member and the armature are strongly fixed to each other because the adhesive agent is interposed between the wall portion and the armature. In addition, it is possible to restrain the uncured adhesive agent from overflowing radially inward. Accordingly, it is possible to restrain the adhesive agent from making contact with the rotor yoke.

The above and other elements, features, steps, characteristics and advantages of the present invention will become more apparent from the following detailed description of the preferred embodiments of the present invention with reference to the attached drawings.

DESCRIPTION OF EMBODIMENTS

Hereinafter, illustrative embodiments of the present invention will now be described with reference to the accompanying drawings. In the subject application, the direction parallel to the center axis of a brushless motor will be called "axial direction". The direction orthogonal to the center axis of the brushless motor will be referred to as "radial direction". The direction extending along an arc about the center axis of the brushless motor will be defined as "circumferential direction". In the subject application, the shape and positional relationship of the respective portions will be described under the assumption that the axial direction extends in the up-down direction and the permanent magnet is positioned at the upper side of the armature. However, the up-down direction is defined merely for the sake of convenience in description and is not intended to limit the direction in the manufacture and use of the brushless motor and the disk drive apparatus according to the present invention.

In the subject application, the term "parallel direction" is intended to include a substantially parallel direction. In the subject application, the term "orthogonal direction" is intended to include a substantially orthogonal direction.

Figure 1:
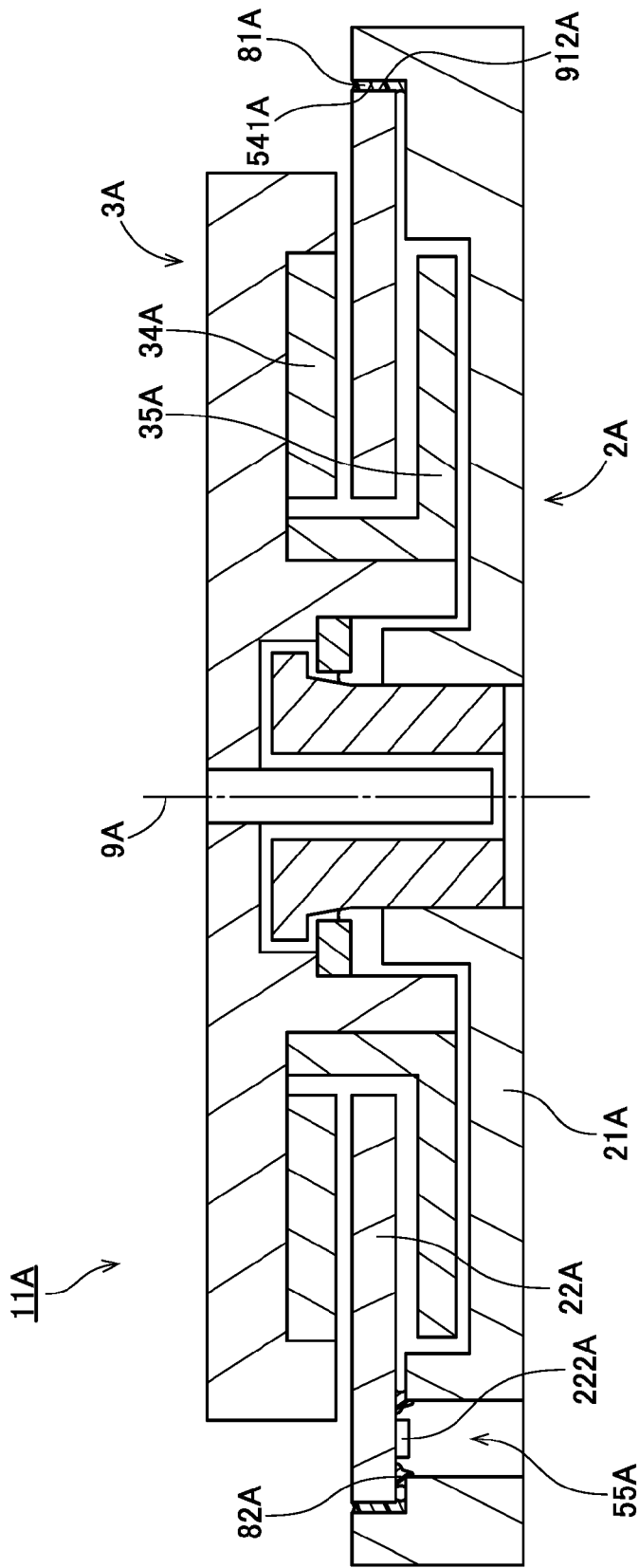
FIG. 1 is a vertical section view showing a brushless motor according to a first preferred embodiment.

FIG. 1 is a vertical section view showing a brushless motor 11A according to a first preferred embodiment. As shown in FIG. 1, the brushless motor 11A includes a stationary unit 2A and a rotary unit 3A. The rotary unit 3A is rotatably supported with respect to the stationary unit 2A.

The stationary unit 2A includes a base member 21A and an armature 22A. The armature 22A extends in a plate-like shape in the direction orthogonal to the center axis 9A. The rotary unit 3A includes a magnet 34A and a rotor yoke 35A made of a magnetic material. The magnet 34A is positioned above the armature 22A. The rotor yoke 35A is positioned below the armature 22A.

The armature 22A includes a power supply portion 222A to which a lead wire is connected. The base member 21A includes a wall portion 541A and a window portion 55A. The wall portion 541A is radially opposed to the outer edge portion 912A of the armature 22A. The window portion 55A lies below the power supply portion 222A and extends axially through the base member 21A.

An adhesive agent 81A is interposed between the wall portion 541A and the outer edge portion 912A of the armature 22A. Thus the base member 21A and the armature 22A are firmly fixed to each other. A sealing material 82A is interposed between the whole periphery of the edge of the window portion 55A and the armature 22A, thereby sealing the window portion 55A.

Figure 2:
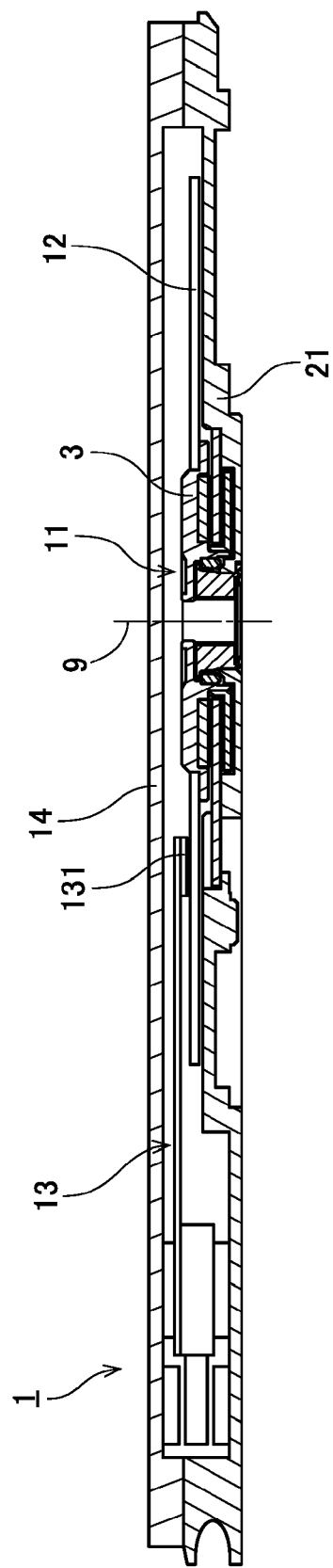
FIG. 2 is a vertical section view showing a disk drive apparatus according to a second preferred embodiment.

FIG. 2 is a vertical section view showing a disk drive apparatus 1 according to a second preferred embodiment. The disk drive apparatus 1 is an apparatus for reading and writing information with respect to a magnetic disk 12 while rotating the magnetic disk 12. As shown in FIG. 2, the disk drive apparatus 1 includes a brushless motor 11, a magnetic disk 12, an access unit 13 and a cover 14.

The brushless motor 11 supports the magnetic disk 12 and rotates the magnetic disk 12 about the center axis 9. The brushless motor 11 includes a base member 21 extending radially at the lower side of the magnetic disk 12. The rotary unit 3 of the brushless motor 11, the magnetic disk 12 and the access unit 13 are accommodated within a housing made up of the base member 21 and the cover 14. The access unit 13 displaces a head 131 along the recording surface of the magnetic disk 12 and performs information reading and writing tasks with respect to the magnetic disk 12. The base member 21 may be formed of a single member or an assembly including a plurality of members.

The disk drive apparatus 1 may include two or more magnetic disks 12. The access unit 13 may perform only one of information reading and writing tasks with respect to the magnetic disk 12.

Figure 3:
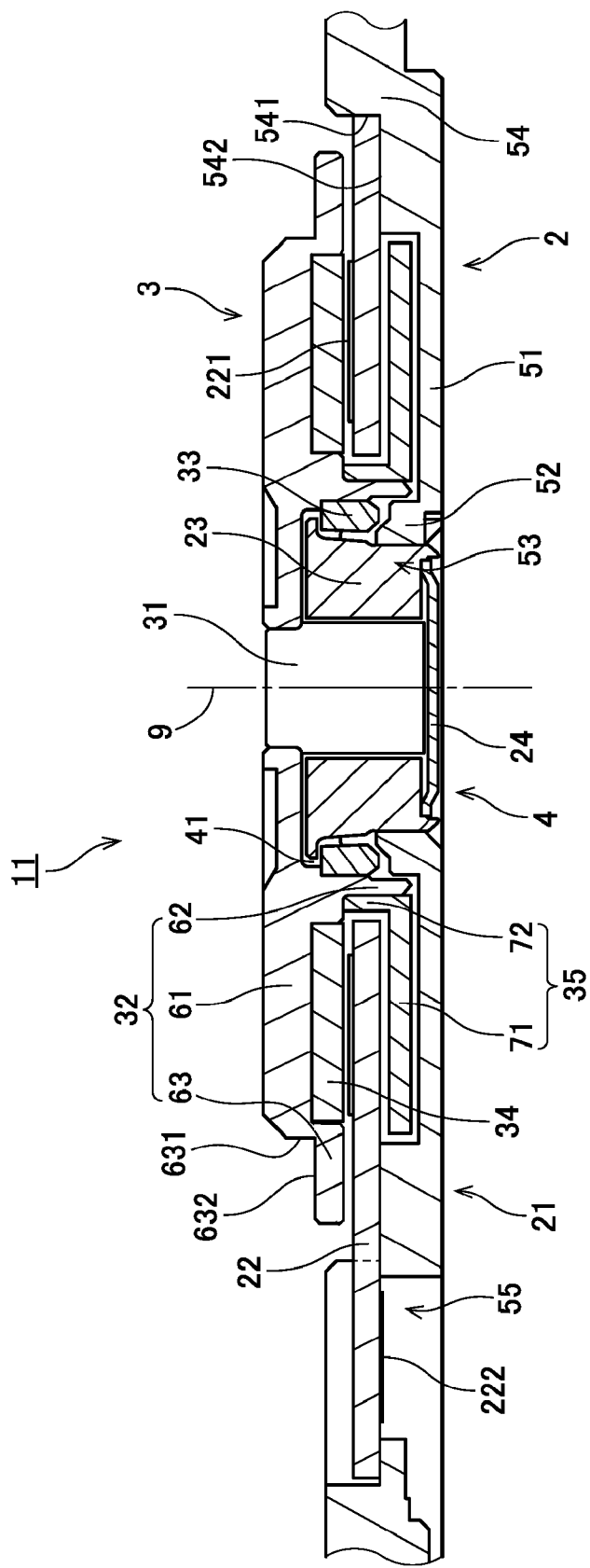
FIG. 3 is a vertical section view showing a brushless motor according to the second preferred embodiment.
Figure 4:
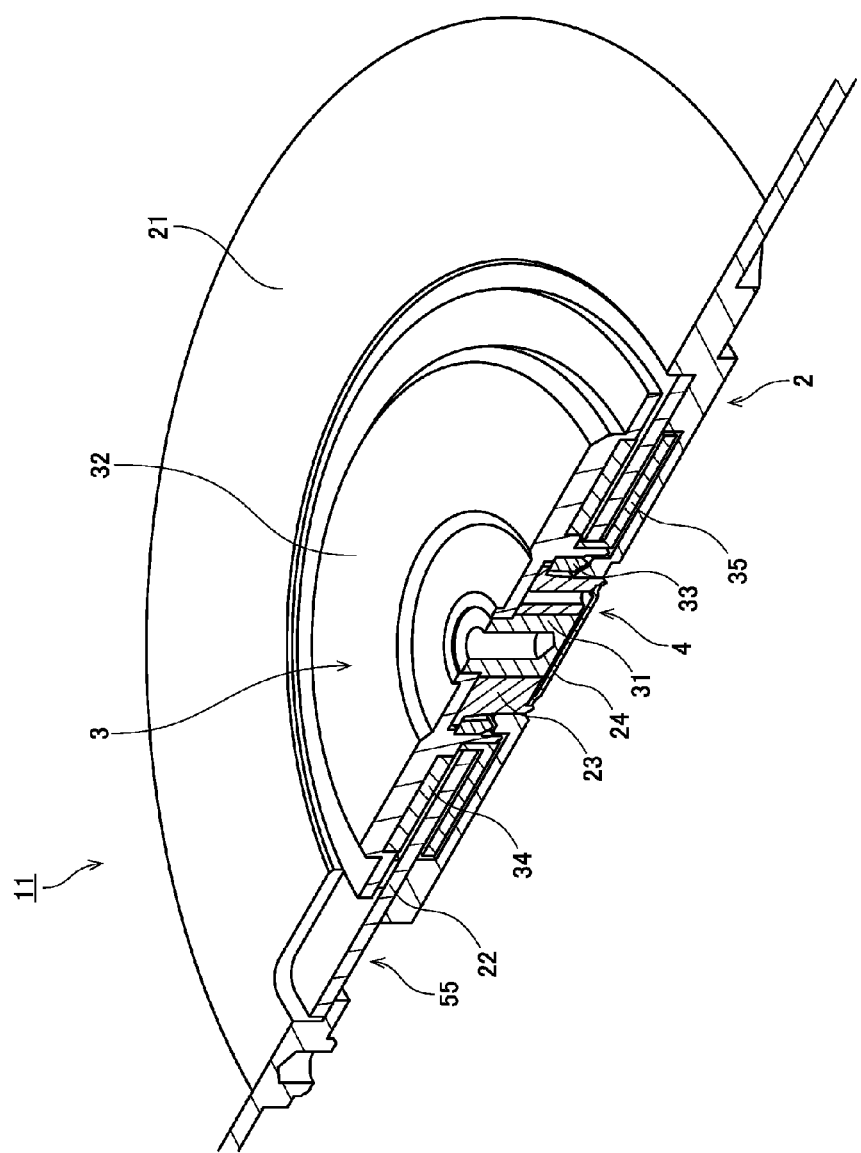
FIG. 4 is a sectional perspective view of the brushless motor according to the second preferred embodiment.

Subsequently, description will be made on the configuration of the brushless motor 11. FIG. 3 is a vertical section view of the brushless motor 11. FIG. 4 is a sectional perspective view of the brushless motor 11. As shown in FIGS. 3 and 4, the brushless motor 11 includes a stationary unit 2 and a rotary unit 3. The stationary unit is kept stopped relative to the base member 21 and the cover 14. The rotary unit 3 is rotatably supported with respect to the stationary unit 2 through a bearing mechanism 4.

Figure 5:
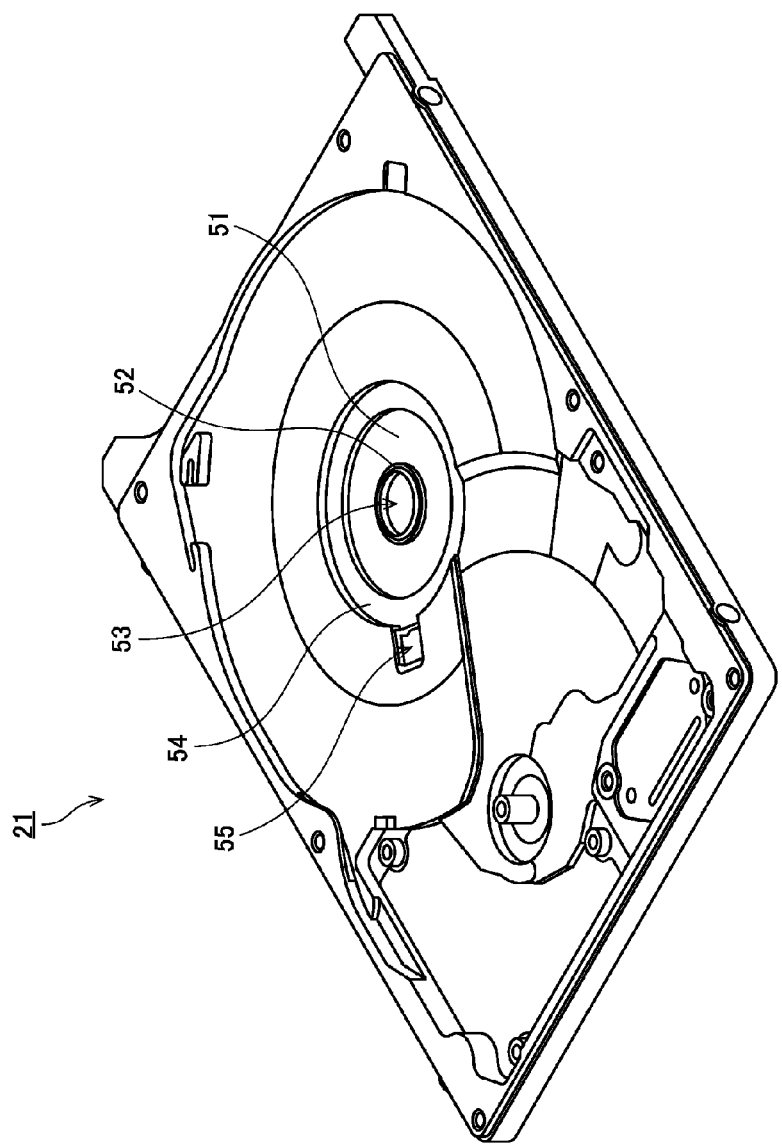
FIG. 5 is a perspective view showing a base member according to the second preferred embodiment.
Figure 6:
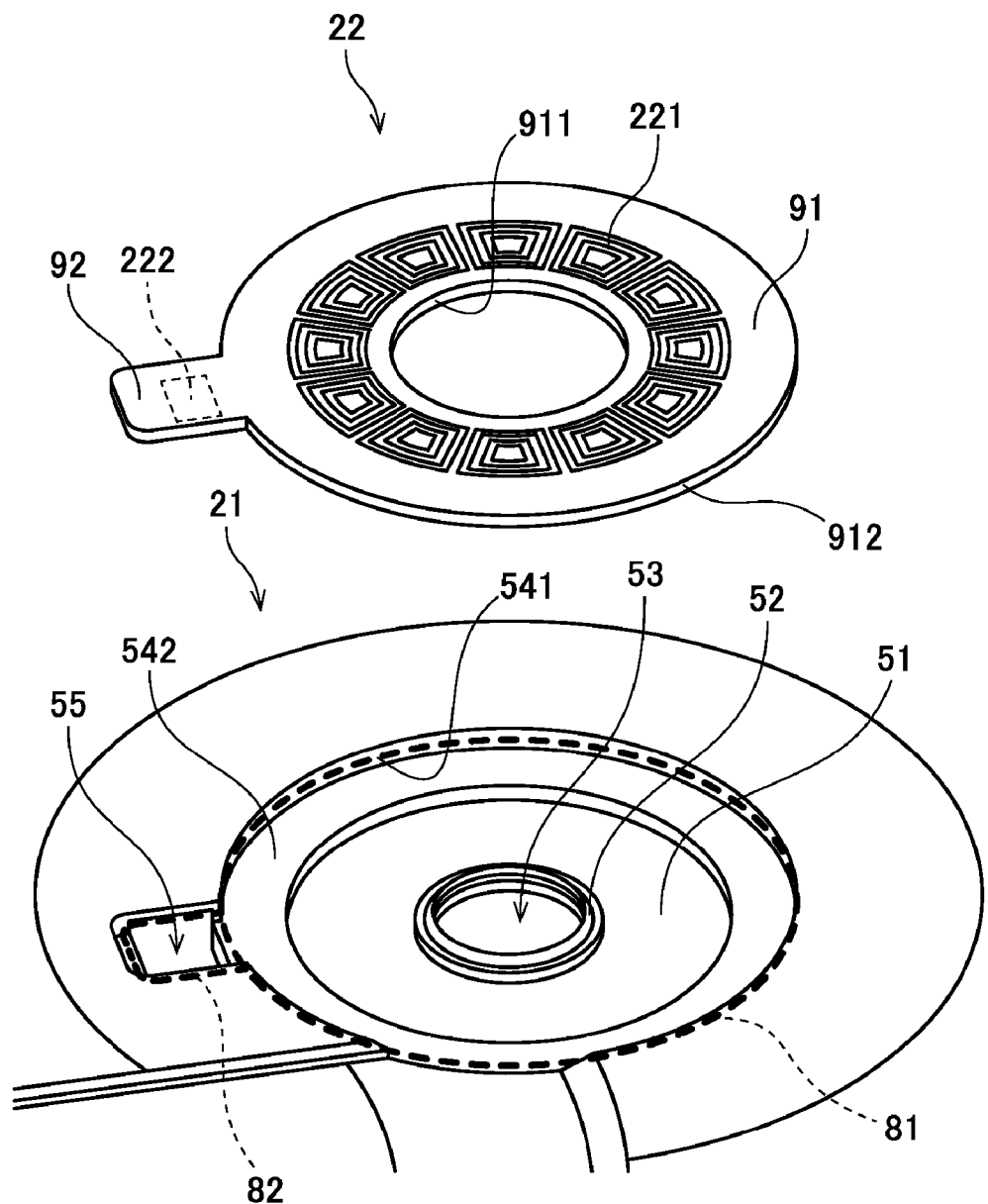
FIG. 6 is an exploded perspective view of the base member and the armature according to the second preferred embodiment.

The stationary unit 2 of the present embodiment includes a base member 21, an armature 22, a sleeve 23 and a cap 24. FIG. 5 is a perspective view of the base member 21. FIG. 6 is an exploded perspective view of the base member 21 and the armature 22.

The base member 21 supports the armature 22 and the sleeve 23. The base member 21 can be formed by casting metal, e.g., aluminum. As shown in FIGS. 3 through 6, the base member 21 includes a bottom plate portion 51, a base protrusion portion 52, a base through-hole 53, an armature holding portion 54 and a window portion 55.

The bottom plate portion 51 lies below the armature 22 and extends in the direction orthogonal to the center axis 9. The base protrusion portion 52 extends upward in a substantially cylindrical shape from the inner periphery of the bottom plate portion 51. The base protrusion portion 52 is positioned radially inward of a hub protrusion portion 62 to be described later. The base through-hole 53 lies radially inward of the base protrusion portion 52 and extends axially through the base member 21. The window portion 55 lies below the power supply portion 222 to be described later and extends axially through the base member 21.

The armature holding portion 54 lies radially outward of a rotor yoke 35 to be described later and protrudes upward from the bottom plate portion 51. The armature holding portion 54 includes a wall portion 541 and an annular surface 542. The wall portion 541 extends in a substantially cylindrical shape in a coaxial relationship with the center axis 9. The annular surface 542 extends radially inward from the lower end of the wall portion 541. The armature 22 is arranged radially inward of the wall portion 541 and is supported on the annular surface 542.

The armature 22 is a flat circuit board extending in the direction orthogonal to the center axis 9. The armature 22 is arranged radially outward of the bearing mechanism 4, below the magnet 34 to be described later and above a disc portion 71 of the rotor yoke 35 to be described later. As shown in FIG. 6, the armature 22 includes an annular plate portion 91 and a lug portion 92. The annular plate portion 91 includes a substantially circular inner edge portion 911 and a substantially circular outer edge portion 912. The outer edge portion 912 is radially opposed to the wall portion 541 of the armature holding portion 54. The lug portion 92 protrudes radially outward in a plate-like shape from the outer edge portion 912 of the annular plate portion 91. The radial outer end of the lug portion 92 is positioned radially outward of the wall portion 541 of the base member 21. The outer edge portion 912 may be opposed to the wall portion 541 in a contacting relationship or in a radially spaced-apart relationship with the wall portion 541.

The annular plate portion 91 includes a plurality of electrically conductive coil patterns 221 arranged along the circumferential direction. Each of the coil patterns 221 is preferably arranged in a helical shape about a coil axis extending in the axial direction. The lug portion 92 includes a power supply portion 222 to which a lead wire is connected. When the disk drive apparatus 1 is in use, a drive current is supplied from the lead wire to the coil patterns 221 through the power supply portion 222.

The sleeve 23 extends axially in a substantially cylindrical shape around a shaft 31 to be described later. The lower portion of the sleeve 23 is inserted into the base through-hole 53 and is fixed to the inner circumferential surface of the base protrusion portion 52. The inner circumferential surface of the sleeve 23 is radially opposed to the outer circumferential surface of the shaft 31. The lower opening of the sleeve 23 is closed by the cap 24.

The rotary unit 3 of the present embodiment includes the shaft 31, a hub 32, an annular member 33, a plurality of magnets 34 and a rotor yoke 35.

The shaft 31 is a member extending in the axial direction. The shaft 31 is made of metal, e.g., stainless steel. The shaft 31 is supported by the sleeve 23 and the cap 24 through a lubricant 41 and is rotated about the center axis 9. The upper end portion of the shaft 31 protrudes upward beyond the upper surface of the sleeve 23.

The hub 32 includes a top plate portion 61, a hub protrusion portion 62 and a disk support portion 63. In the present embodiment, the hub 32 as a whole is made of a magnetic material. The top plate portion 61 lies above the armature 22 and extends radially and circumferentially. The radial inner edge portion of the top plate portion 61 is fixed to the upper end portion of the shaft 31. The hub protrusion portion 62 extends downward from the top plate portion 61 in a substantially cylindrical shape. The shaft 31 and the hub 32 may be a continuously extending member. The hub 32 may be formed of a single member or an assembly including a plurality of members.

The disk support portion 63 is arranged radially outward of the top plate portion 61 to support the magnetic disk 12. The disk support portion 63 includes a substantially cylindrical first support surface 631 and a second support surface 632 extending radially outward from the lower end of the first support surface 631. The inner circumferential portion of the magnetic disk 12 preferably makes contact with the first support surface 631. Thus the magnetic disk 12 is positioned in place in the radial direction. The lower surface of the magnetic disk 12 makes contact with the second support surface 632. Accordingly, the magnetic disk 12 is positioned in place in the axial direction.

The annular member 33 is a circular ring-shaped member positioned radially inward of the hub protrusion portion 62. The upper surface of the annular member 33 makes contact with the lower surface of the top plate portion 61. The radial outer surface of the annular member 33 is fixed to the inner circumferential surface of the hub protrusion portion 62 by press fit and/or by a fixing means such as an adhesive agent.

A lubricant 41 exists between the combination of the sleeve 23 and the cap 24 and the combination of the shaft 31, the hub 32 and the annular member 33. The liquid surface of the lubricant 41 is positioned between the outer circumferential surface of the sleeve 23 and the inner circumferential surface of the annular member 33. The shaft 31, the hub 32 and the annular member 33 are rotatably supported with respect to the sleeve 23 and the cap 24 through the lubricant 41. In the present embodiment, the bearing mechanism 4 is made up of: the sleeve 23 and the cap 24 of the stationary unit 2; the shaft 31, the hub 32 and the annular member 33 of the rotary unit 3; and the lubricant 41 existing therebetween. For example, polyol ester-based oil or diester-based lubricating liquid is used as the lubricant 41.

A radial dynamic pressure groove array is provided on at least one of the inner circumferential surface of the sleeve 23 and the outer circumferential surface of the shaft 31. The radial dynamic pressure groove array is formed into, e.g., a herringbone shape. Upon driving the brushless motor 11, the radial dynamic pressure groove array induces a radial dynamic pressure in the lubricant 41 existing between the sleeve 23 and the shaft 31. The shaft 31 is radially supported with respect to the sleeve 23 by the dynamic pressure thus induced.

A thrust dynamic pressure groove array is provided on at least one of the upper surface of the sleeve 23 and the lower surface of the top plate portion 61. The thrust dynamic pressure groove array is formed into, e.g., a herringbone shape. Upon driving the brushless motor 11, the thrust dynamic pressure groove array induces an axial dynamic pressure in the lubricant 41 existing between the sleeve 23 and the hub 32. The hub 32 is axially supported with respect to the sleeve 23 by the axial dynamic pressure thus induced. The thrust dynamic pressure groove array may be, e.g., a spiral groove array for increasing a pressure at the radial inner side.

The magnets 34 are fixed to the lower surface of the top plate portion 61 of the hub 32 by means of, e.g., an adhesive agent. The magnets 34 are positioned above the armature 22. The lower surface of each of the magnets 34 is a magnetic pole surface axially opposed to each of the coil patterns 221 provided on the upper surface of the armature 22. The magnets 34 are arranged along the circumferential direction in such a way that the magnetic pole surfaces of N-pole and the magnetic pole surfaces of S-pole can be alternately arranged side by side. A single annular magnet alternately magnetized with N-poles and S-poles along the circumferential direction may be used in place of the magnets 34.

The rotor yoke 35 is a magnetic body rotating together with the hub 32 and the magnets 34. The rotor yoke 35 of the present embodiment includes a disc portion 71 and a yoke protrusion portion 72. The disc portion 71 is positioned below the armature 22, above the bottom plate portion 51 of the base member 21 and radially inward of the armature holding portion 54 of the base member 21. The disc portion 71 extends in a circular ring shape. The upper surface of the disc portion 71 is axially opposed to the lower surface of the armature 22. The yoke protrusion portion 72 lies radially inward of the armature 22 and extends upward from the disc portion 71 in a substantially cylindrical shape. The yoke protrusion portion 72 is fixed to the hub protrusion portion 62.

In the brushless motor 11 described above, magnetic flux axially penetrating the armature 22 is generated if a drive current is supplied to the coil patterns 221 through the power supply portion 222. In addition, a magnetic circuit extending through the armature 22, the magnets 34, the hub 32 and the rotor yoke 35 is formed. Circumferential torque is generated under the action of the magnetic flux. As a result, the rotary unit 3 is rotated about the center axis 9 with respect to the stationary unit 2. The magnetic disk 12 supported on the hub 32 is rotated about the center axis 9 together with the rotary unit 3.

Next, description will be made on a structure for fixing the armature 22 to the base member 21.

Figure 7:
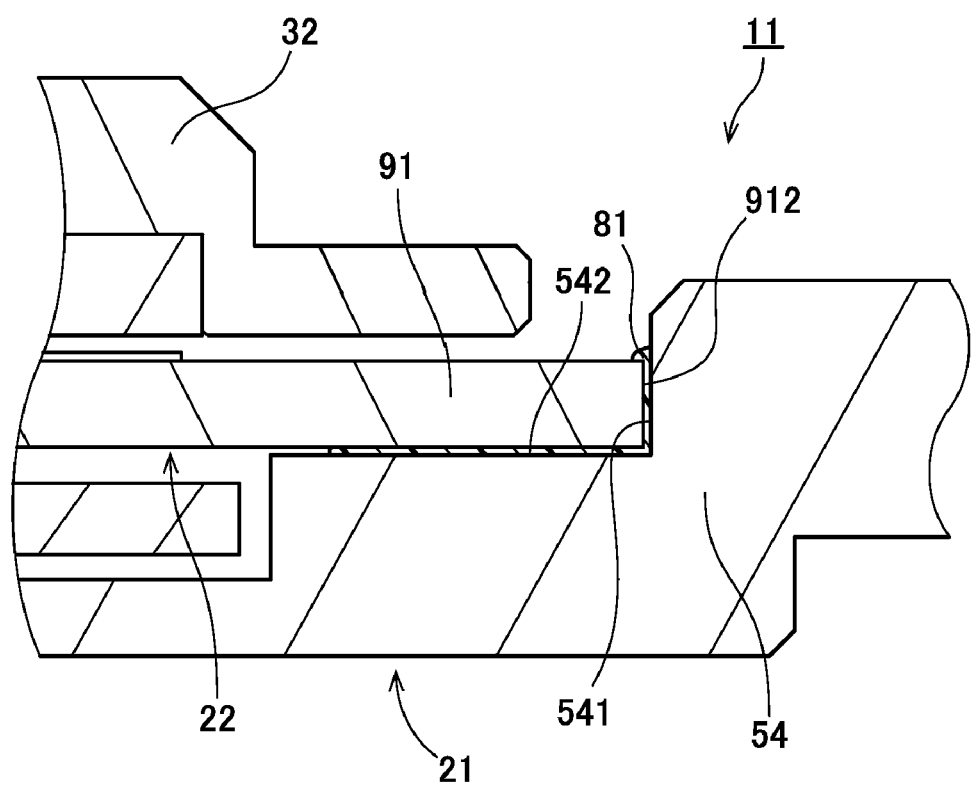
FIG. 7 is a partial section view of the brushless motor according to the second preferred embodiment.
Figure 8:
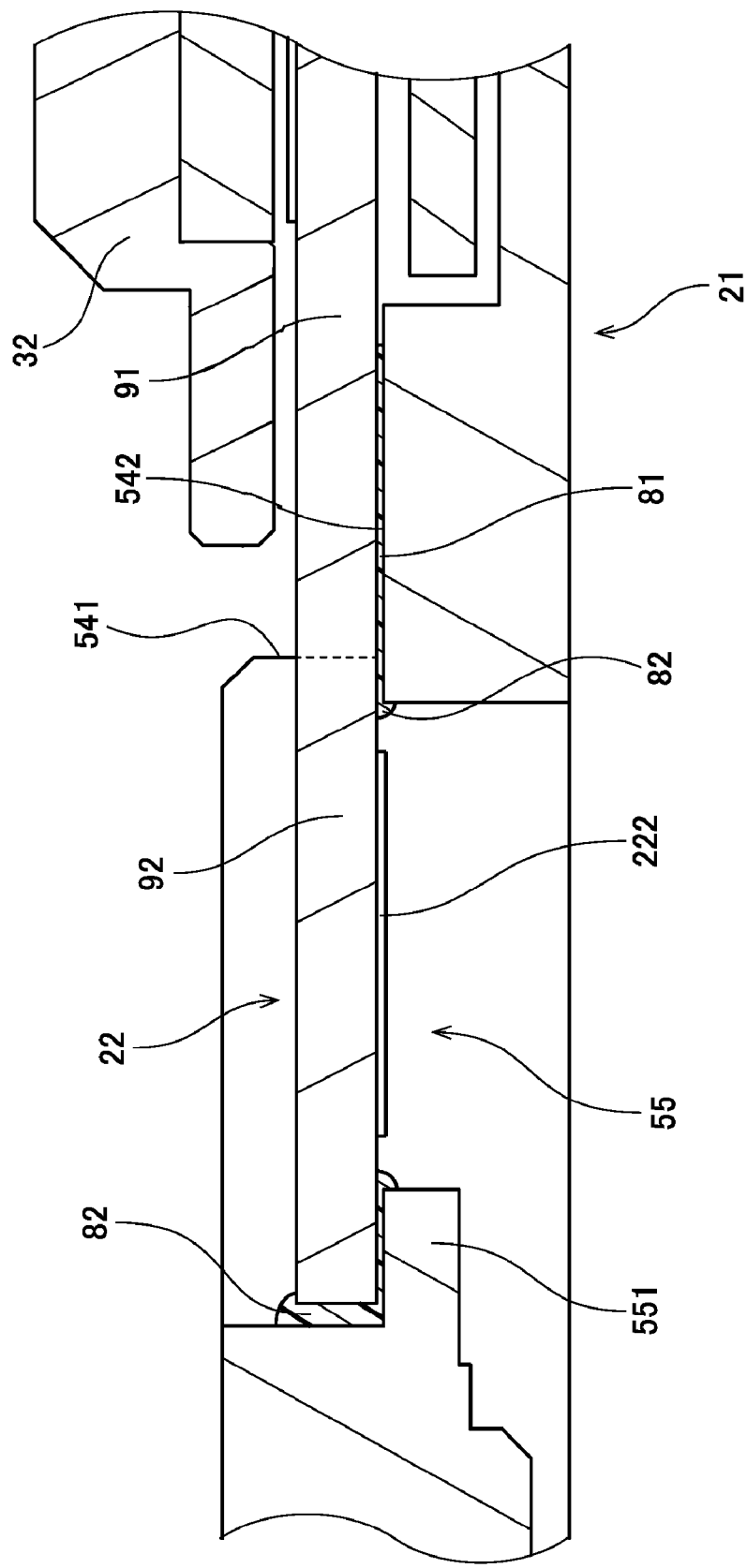
FIG. 8 is an enlarged partial section view of the brushless motor according to the second preferred embodiment.

FIGS. 7 and 8 are partial vertical section views of the brushless motor 11. As shown in FIGS. 6 through 8, the base member 21 and the armature 22 are fixed to each other by a first adhesive agent 81 and a second adhesive agent 82.

The first adhesive agent 81 is held between the wall portion 541 and the annular surface 542 of the base member 21 and the annular plate portion 91 of the armature 22. In other words, the first adhesive agent 81 is interposed between the wall portion 541 and the outer edge portion 912 of the annular plate portion 91 and between the annular surface 542 and the lower surface of the annular plate portion 91. Fine irregularities exists on the surfaces of the wall portion 541 and the outer edge portion 912. The irregularities and the first adhesive agent 81 make close contact with each other. This provides an anchor effect by which the armature 22 is prevented from being removed upward. As a consequence, the base member 21 and the armature 22 are firmly fixed to each other.

Since the armature 22 of the present embodiment includes the lug portion 92, the outer edge portion 912 of the annular plate portion 91 does not continuously extend in an annular shape. However, the first adhesive agent 81 existing between the annular surface 542 and the lower surface of the annular plate portion 91 continuously extends in an annular shape. Consequently, the base member 21 and the armature 22 are strongly fixed to each other.

The second adhesive agent 82 is interposed between the whole periphery of the edge of the window portion 55 and the lug portion 92 of the armature 22. This prevents a gas from moving into and out of the disk drive apparatus 1 through the window portion 55. As a result, the internal space of the disk drive apparatus 1 is kept airtight. In the present embodiment, the second adhesive agent 82 serves as a sealing material for sealing the window portion 55. In the subject application, the term "the edge of the window portion" signifies the area of the base member existing in the peripheral edge of the window portion.

As shown in FIG. 8, the base member 21 of the present embodiment includes a seat portion 551 protruding radially inward from the lower end portion of the radial outer edge of the window portion 55. The lug portion 92 of the armature 22 is arranged on the upper surface of the seat portion 551 with the second adhesive agent 82 interposed therebetween. During the course of manufacturing the brushless motor 11, the uncured second adhesive agent 82 is stably held on the upper surface of the seat portion 551. Due to the existence of the seat portion 551, the lug portion 92 of the armature 22 can be pressed downward against the seat portion 551 in the bonding process. This helps increase the fixing strength of the base member 21 and the lug portion 92. This also enhances the sealability of the window portion 55.

In the present embodiment, as shown in FIGS. 7 and 8, the outer edge portion 912 and the lug portion 92 of the armature 22 are positioned radially outward of the radial outer edge portion of the hub 32. Therefore, the outer edge portion 912 and the lug portion 92 of the armature 22 can be pressed downward with ease even when the armature 22 and the hub 32 are simultaneously fixed to the base member 21. This helps increase the fixing strength of the base member 21 and the lug portion 92. This also enhances the sealability of the window portion 55.

In the present embodiment, as shown in FIGS. 7 and 8, at least a portion of the first adhesive agent 81 and the second adhesive agent 82 makes contact with the upper surface of the armature 22. This further enhances the fixing strength of the armature 22 with respect to the base member 21 and the sealability of the window portion 55. If the first adhesive agent 81 and the second adhesive agent 82 extend to the upper surface of the armature 22, it becomes easy to confirm the application state of the first adhesive agent 81 and the second adhesive agent 82 from above.

In a hypothetical case that the window portion 55 is positioned radially inward of the wall portion 541, the second adhesive agent 82 is applied to the radial inner edge of the window portion 55. In this case, the second adhesive agent 82 and the radial outer edge portion of the rotor yoke 35 are likely to make contact with each other. In order to reduce the likelihood of such contact, it is preferred that at least a portion of the window portion 55 be arranged radially outward of the wall portion 541 and further that the radial inner edge of the window portion 55 be positioned far away from the rotor yoke 35.

In the present embodiment, the entirety of the window portion 55 is positioned radially outward of the wall portion 541. This restrains the second adhesive agent 82 arranged in the radial inner edge of the window portion 55 from making contact with the rotor yoke 35. Moreover, at the radial inner side of the wall portion 541, the first adhesive agent 81 can be arranged in an annular shape without being dented radially inward.

In the present embodiment, the same kind of adhesive agent is used as the first adhesive agent 81 and the second adhesive agent 82. This makes it possible to apply the first adhesive agent 81 and the second adhesive agent 82 with one and the same nozzle during the course of manufacturing the brushless motor 11. It is therefore possible to enhance the work efficiency and to reduce the manufacturing cost. Alternatively, different adhesive agents may be used as the first adhesive agent 81 and the second adhesive agent 82. For example, an adhesive agent higher in fixing strength than the second adhesive agent 82 may be used as the first adhesive agent 81. An adhesive agent higher in sealability than the first adhesive agent 81 may be used as the second adhesive agent 82.

Figure 9:
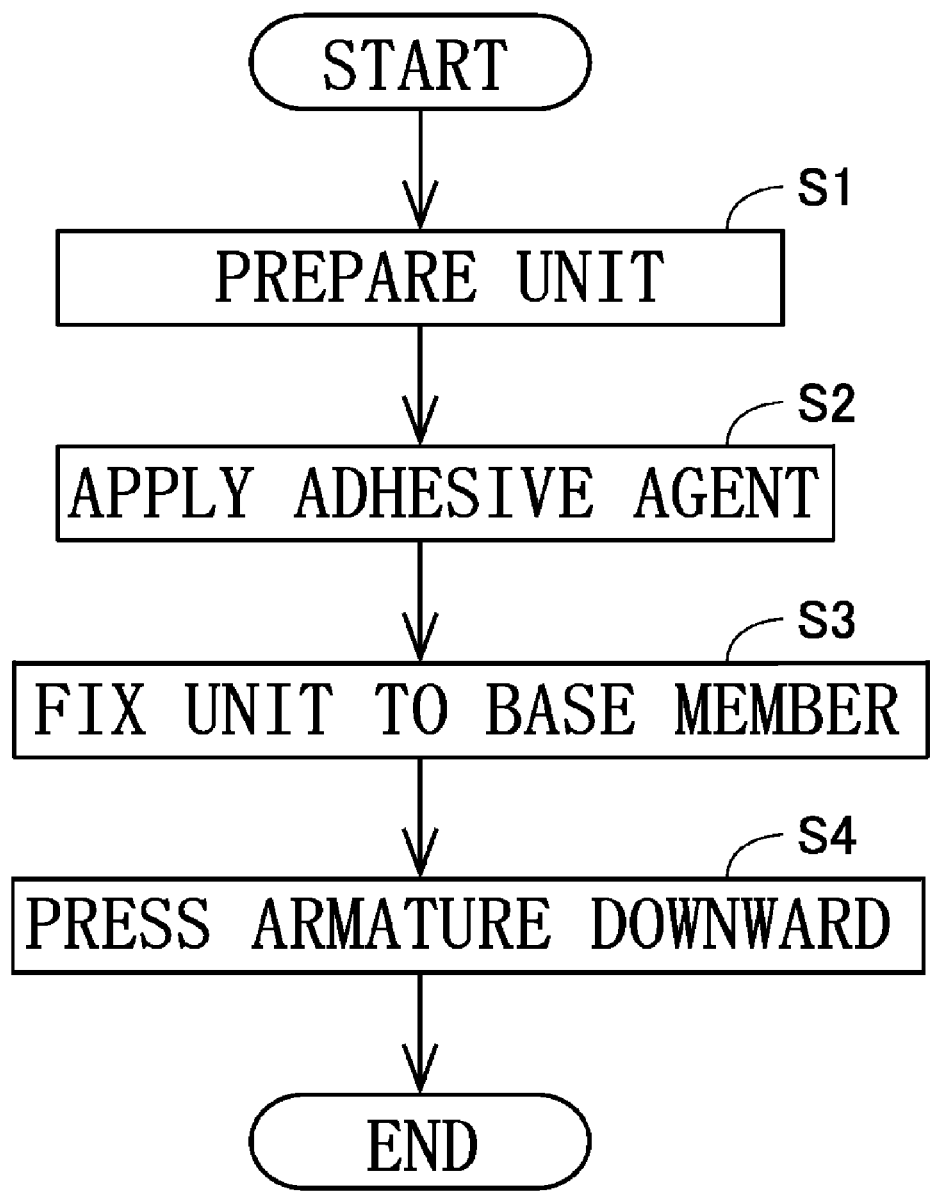
FIG. 9 is a flowchart illustrating some of the manufacturing steps of the brushless motor according to the second preferred embodiment.
Figure 10:
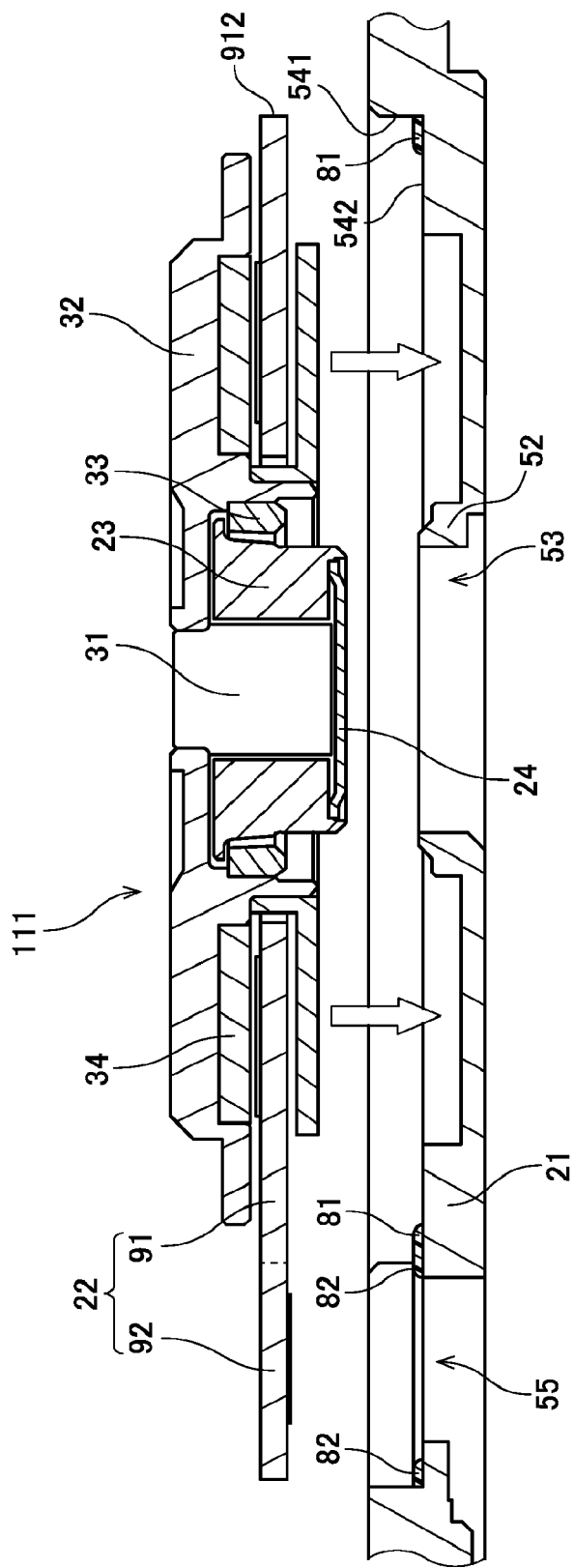
FIG. 10 is a vertical section view showing the brushless motor according to the second preferred embodiment, which is under a manufacturing process.

FIG. 9 is a flowchart illustrating some of the manufacturing steps of the brushless motor 11. FIG. 10 is a vertical section view showing the brushless motor 11 which is under a manufacturing process. A manufacturing sequence of the brushless motor 11 will now be described with reference to FIGS. 9 and 10.

When manufacturing the brushless motor 11, a unit 111 including the armature 22, the sleeve 23, the cap 24, the shaft 31, the hub 32, the annular member 33, the magnets 34 and the rotor yoke 35 is prepared first (step S1).

Next, the first adhesive agent 81 and the second adhesive agent 82 are applied on the base member 21 (step S2). For example, as shown in FIG. 10, the first adhesive agent 81 is annularly applied on the radial outer edge portion of the annular surface 542 and on the wall portion 541. The second adhesive agent 82 is applied on the whole periphery of the edge of the window portion 55. It is preferred that the second adhesive agent 82 be partially applied on the upper surface of the seat portion 551.

One or both of the first adhesive agent 81 and the second adhesive agent 82 may be applied on the armature 22. For example, the first adhesive agent 81 may be applied on the outer edge portion 912 of the armature 22. The second adhesive agent 82 may be applied on the whole periphery of the portion of the lower surface of the lug portion 92 positioned above the window portion 55.

If the application of the first adhesive agent 81 and the second adhesive agent 82 is finished, the unit 111 is then fixed to the base member 21 (step S3). As shown in FIG. 10, the unit 111 is lowered from above the base member 21. Then, the lower portion of the sleeve 23 is inserted into the base through-hole 53. The lower portion of the sleeve 23 is press-fitted or adhesively fixed to the inner circumferential surface of the base protrusion portion 52. The armature 22 is arranged radially inward of the wall portion 541 and above the annular surface 542.

Subsequently, the upper surface of the armature 22 positioned radially outward of the hub 32 is pressed downward (step S4). Consequently, the first adhesive agent 81 is spread out between the wall portion 541 of the base member 21 and the outer edge portion 912 of the armature 22. Moreover, the first adhesive agent 81 is spread out between the annular surface 542 of the base member 21 and the lower surface of the armature 22. As a result, the base member 21 and the armature 22 are strongly fixed to each other. In addition, the second adhesive agent 82 is spread out between the edge of the window portion 55 and the lug portion 92 of the armature 22. As a result, the window portion 55 is sealed.

Thereafter, the assembly including the base member 21 and the unit 111 is brought into a thermostatic oven. Then, the first adhesive agent 81 and the second adhesive agent 82 are heated within the thermostatic oven, thereby curing the first adhesive agent 81 and the second adhesive agent 82.

After step S3 or S4 and prior to bringing the assembly into the thermostatic oven, the second adhesive agent 82 may be additionally applied on the whole periphery of the edge of the window portion 55 at the lower surface side of the base member 21. This makes it possible to further enhance the sealability of the window portion 55. In addition, the application of the second adhesive agent 82 may be omitted in step S2 and, after step S3 or S4 and prior to bringing the assembly into the thermostatic oven, the second adhesive agent 82 may be applied on the whole periphery of the edge of the window portion 55 at the lower surface side of the base member 21.

Figure 11:
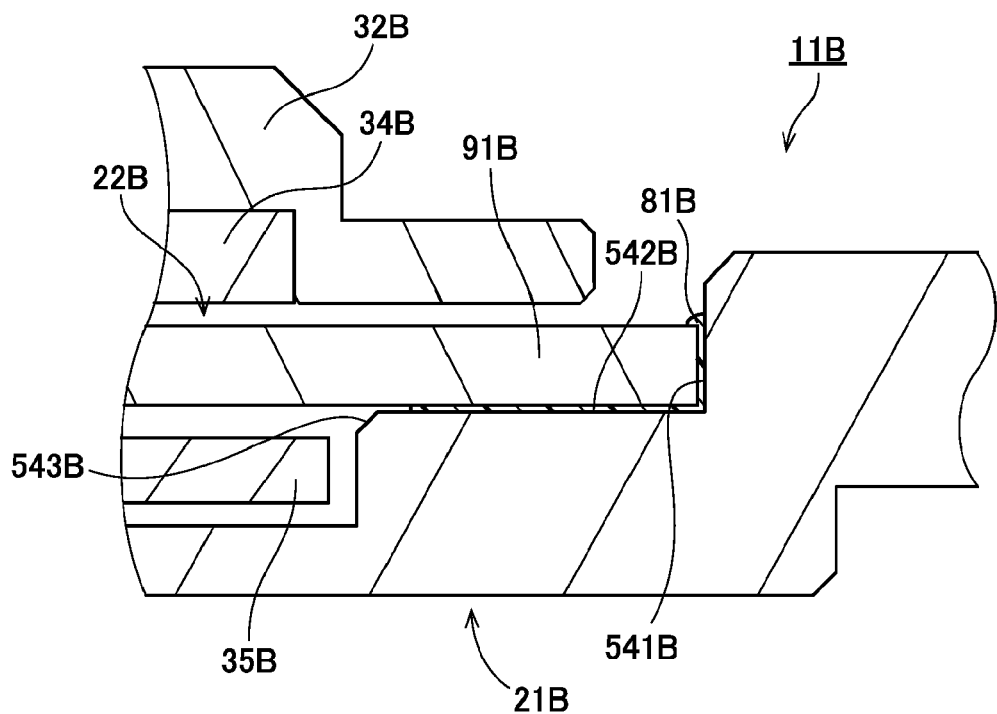
FIG. 11 is a partial vertical section view showing a brushless motor according to a third preferred embodiment.

FIG. 11 is a partial vertical section view of a brushless motor 11B according to a third embodiment of the present invention. Description will now be made on the brushless motor 11B of the third embodiment with emphasis placed on the points differing from the second embodiment.

As shown in FIG. 11, in case of the brushless motor 11B, the annular plate portion 91B of the armature 22B is arranged on the annular surface 542B of the base member 21B with the first adhesive agent 81B interposed therebetween. The base member 21B shown in FIG. 11 includes a first tapering surface 543B positioned radially inward of the annular surface 542B. The first tapering surface 543B extends radially inward and downward from the radial inner end of the annular surface 542B. Accordingly, the axial gap between the first tapering surface 543B and the lower surface of the annular plate portion 91B is enlarged radially inward.

The first tapering surface 543B may have a rectilinear shape in the vertical cross section as shown in FIG. 11 or may have a curved shape in the vertical cross section. It is preferred that the first tapering surface 543B extend continuously in an annular shape about the center axis.

When manufacturing the brushless motor 11B, the same steps as steps S1 through S3 of the second embodiment are performed. In other words, a unit including the armature 22B, the sleeve, the cap, the shaft, the hub 32B, the annular member, the magnets 34B and the rotor yoke 35B is prepared first. Then, the first adhesive agent 81B and the second adhesive agent 82B are applied on the base member 21B or the armature 22B. Thereafter, the unit is fixed to the base member 21B. At this time, the armature 22B is arranged radially inward of the wall portion 541B and above the annular surface 542B.

As the lower surface of the armature 22B and the annular surface 542B come close to each other, the uncured first adhesive agent 81B is spread radially inward. However, even if the first adhesive agent 81B is spread to the first tapering surface 543B, the first adhesive agent 81B stays between the first tapering surface 543B and the lower surface of the armature 22B due to the surface tension. In other words, the first adhesive agent 81B is held between the first tapering surface 543B and the lower surface of the armature 22B due to the surface tension. This increases the fixing strength of the armature 22B with respect to the base member 21B. Moreover, this restrains the first adhesive agent 81B from overflowing radially inward beyond the first tapering surface 543B. Accordingly, the first adhesive agent 81B and the rotor yoke 35B are restrained from making contact with each other.

Figure 12:
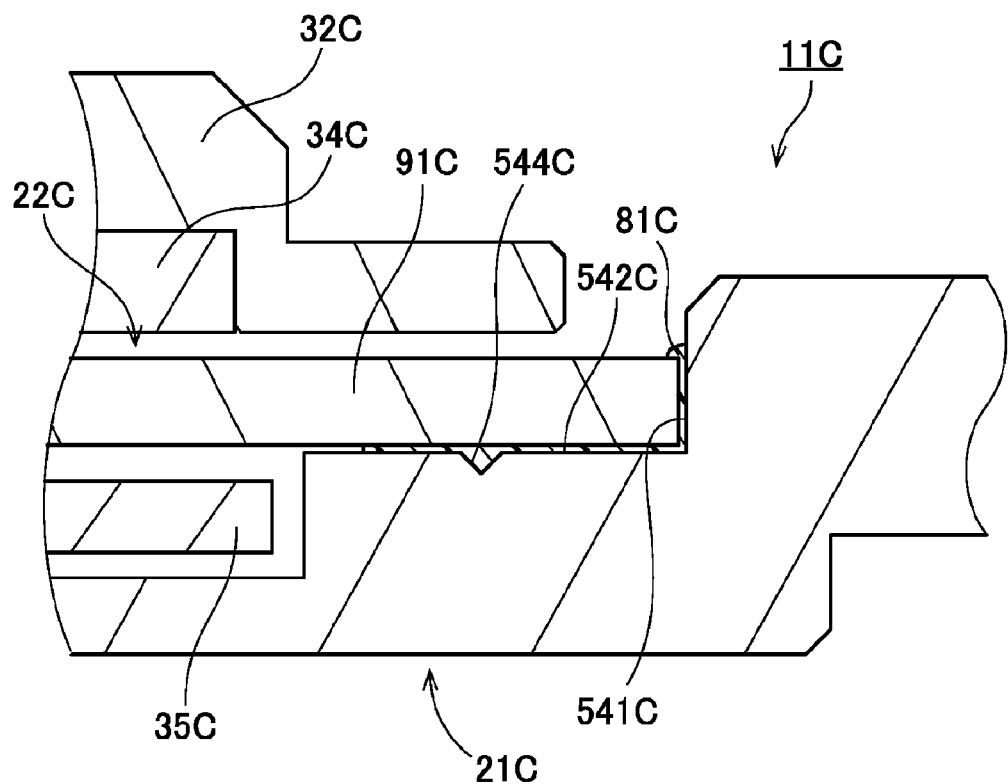
FIG. 12 is a partial vertical section view showing a brushless motor according to a fourth preferred embodiment.

FIG. 12 is a partial vertical section view of a brushless motor 11C according to a fourth embodiment of the present invention. Description will now be made on the brushless motor 11C of the fourth embodiment with emphasis placed on the points differing from the second embodiment.

As shown in FIG. 12, in case of the brushless motor 11C, the annular plate portion 91C of the armature 22C is arranged on the annular surface 542C of the base member 21C with the first adhesive agent 81C interposed therebetween. The base member 21C shown in FIG. 12 includes a groove portion 544C provided on the annular surface 542C. The groove portion 544C may have a substantially V-like shape in the vertical cross section as shown in FIG. 12 or may have an arc-like shape or a rectangular shape in the vertical cross section. It is preferred that the groove portion 544C extend continuously in an annular shape about the center axis.

When manufacturing the brushless motor 11C, the same steps as steps S1 through S3 of the second embodiment are performed. In other words, a unit including the armature 22C, the sleeve, the cap, the shaft, the hub 32C, the annular member, the magnets 34C and the rotor yoke 35C is prepared first. Then, the first adhesive agent 81C and the second adhesive agent are applied on the base member 21C or the armature 22C. Thereafter, the unit is fixed to the base member 21C. At this time, the armature 22C is arranged radially inward of the wall portion 541C and above the annular surface 542C.

As the lower surface of the armature 22C and the annular surface 542C come close to each other, the uncured first adhesive agent 81C is spread radially inward. However, a portion of the first adhesive agent 81C flows into the groove portion 544C and stays within the groove portion 544C. This increases the fixing strength of the armature 22C with respect to the base member 21C. Moreover, this restrains the first adhesive agent 81C from spreading radially inward. Accordingly, the first adhesive agent 81C and the rotor yoke 35C are restrained from making contact with each other.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

Figure 13:
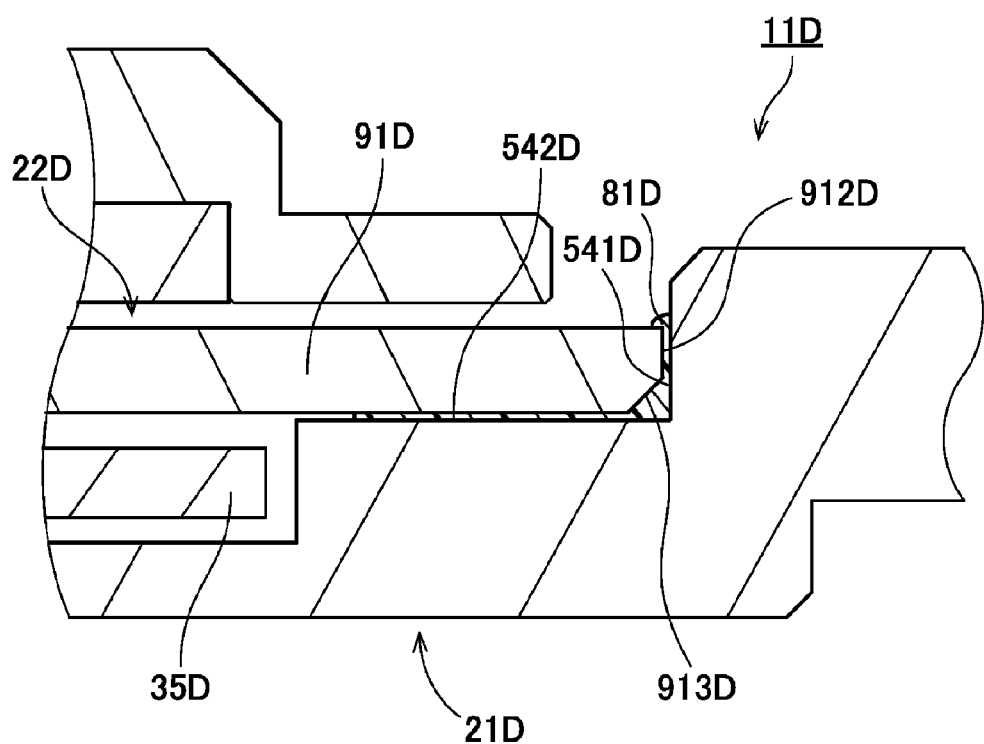
FIG. 13 is a partial vertical section view showing a brushless motor according to one modified example.

FIG. 13 is a partial vertical section view showing a brushless motor 11D according to one modified example. In the example shown in FIG. 13, the armature 22D includes a second tapering surface 913D formed below the outer edge portion 912D. The second tapering surface 913D interconnects the lower end of the outer edge portion 912D and the radial outer edge of the lower surface of the annular plate portion 91D. Accordingly, the radial gap between the second tapering surface 913D and the wall portion 541D is larger than the radial gap between the outer edge portion 912D and the wall portion 541D. In addition, the axial gap between the second tapering surface 913D and the annular surface 542D is larger than the axial gap between the lower surface of the annular plate portion 91D and the annular surface 542D.

This makes sure that a portion of the first adhesive agent 81D is held between the second tapering surface 913D and the base member 21D. Consequently, the base member 21D and the armature 22D are strongly fixed to each other. In addition, the first adhesive agent 81D is restrained from spreading radially inward. This restrains the first adhesive agent 81D and the rotor yoke 35D from making contact with each other.

Figure 14:
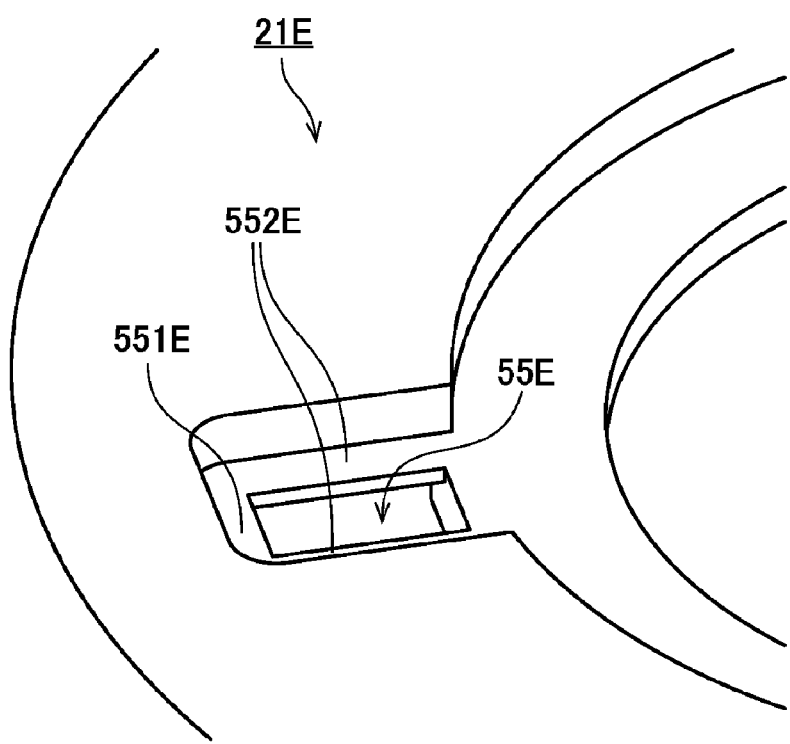
FIG. 14 is a partial perspective view showing a base member according to another modified example.

FIG. 14 is a partial perspective view showing a base member 21E according to another modified example. The base member 21E shown in FIG. 14 includes a first seat portion 551E and a pair of second seat portions 552E, which are formed around the window portion 55E. The first seat portion 551E is positioned radially outward of the window portion 55E. The second seat portions 552E are positioned at the circumferential opposite sides of the window portion 55. The armature is arranged on the first seat portion 551E and the second seat portions 552E with the second adhesive agent interposed therebetween. This ensures that the second adhesive agent and the armature are stably held around the window portion 55E. Thus the window portion 55E is sealed in a more reliable manner. In addition, the armature is strongly fixed to the base member 21E.

The number and shape of the seat portion is not limited to the examples shown in FIGS. 8 and 14. It is only necessary that the seat portion be formed in at least a portion of the periphery of the window portion to face the lower surface of the armature. Alternatively, the second adhesive agent may be interposed between the whole periphery of the edge of the window portion and the armature without having to forming the seat portion in the base member.

Figure 15:
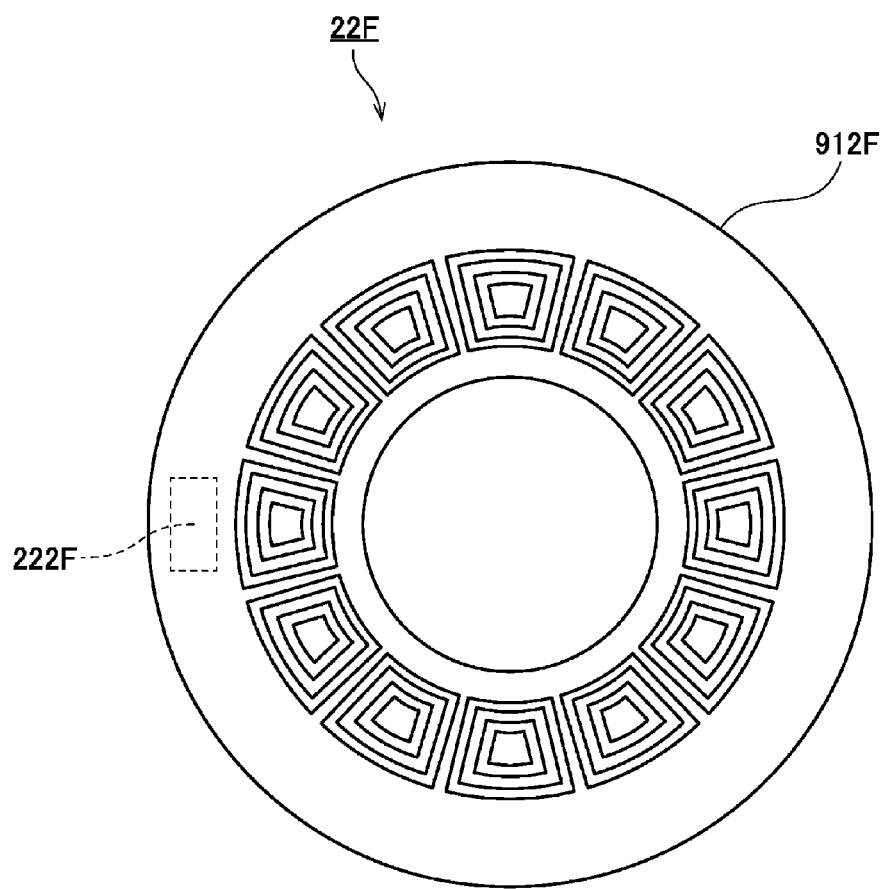
FIG. 15 is a plan view showing an armature according to a further modified example.

FIG. 15 is a plan view showing an armature 22F according to a further modified example. The armature 22F shown in FIG. 15 does not include a lug portion. In the example shown in FIG. 15, the outer edge portion 912F of the armature 22F extends continuously in an annular shape. The power supply portion 222F is arranged radially inward of the outer edge portion 912F. In this case, the window portion is arranged radially inward of the wall portion of the base member. The second adhesive agent is arranged radially inward of the first adhesive agent. The outer edge portion of the armature may have a polygonal shape or such a shape such that identical segments are regularly arranged over the whole circumference of the outer edge portion.

Further, the sealing material existing between the whole periphery of the edge of the window portion and the armature may not necessarily be an adhesive agent. For example, instead of the second adhesive agent, a resin-made sticky sheet or a solder may be arranged as the sealing material. The sealing material is arranged adjacent to the power supply portion. In order to prevent electric connection of the sealing material and the power supply portion, the sealing material is preferably made of an insulating material such as a resin or the like.

In addition, the brushless motor of the present invention may be a so-called fixed-shaft motor in which a shaft belongs to a stationary unit and a sleeve belongs to a rotary unit. The brushless motor and the disk drive apparatus of the present invention may be used to rotate a disk other than the magnetic disk, e.g., an optical disk.

Moreover, the specific shape of the respective members may differ from the shape shown in the respective figures of the subject application.

Furthermore, the respective elements appearing in the foregoing preferred embodiments and the modifications thereof may be combined appropriately as long as no conflict arises.

The invention claimed is:
1. A brushless motor, comprising:
a stationary unit; and
a rotary unit rotatably supported with respect to the stationary unit,
wherein the stationary unit includes a flat armature extending in a direction orthogonal to a vertically-extending center axis and a base member arranged to support the armature,
the rotary unit includes a magnet positioned above the armature and a magnetic rotor yoke positioned below the armature,
the armature includes a power supply portion to which a lead wire is connected,
the base member includes a wall portion radially opposed to an outer edge portion of the armature and a window portion positioned below the power supply portion to axially extend through the base member,
an adhesive agent exists between the wall portion and the outer edge portion of the armature, and
a sealing material is interposed between a whole periphery of an edge of the window portion and the armature.

2. The brushless motor of claim 1, wherein the rotary unit further includes a hub lying above the armature and extending in a radial direction and a circumferential direction, the outer edge portion of the armature being positioned radially outward of an outer edge portion of the hub.

3. The brushless motor of claim 1, wherein the adhesive agent is positioned radially inward of the wall portion to continuously extend in an annular shape.

4. The brushless motor of claim 1, wherein at least a portion of the window portion is positioned radially outward of the wall portion.

5. The brushless motor of claim 1, wherein the armature includes a lug portion protruding radially outward beyond the wall portion, the power supply portion being arranged in the lug portion.

6. The brushless motor of claim 5, wherein the window portion as a whole is positioned radially outward of the wall portion.

7. The brushless motor of claim 1, wherein the outer edge portion of the armature has such a shape that identical segments are regularly arranged over a whole circumference of the outer edge portion or an annular shape, the power supply portion being arranged radially inward of the outer edge portion of the armature.

8. The brushless motor of claim 5, wherein the base member further includes a seat portion arranged in at least a portion of a periphery of the window portion and opposed to a lower surface of the armature, the armature being arranged on an upper surface of the seat portion with the sealing material interposed therebetween.

9. The brushless motor of claim 8, wherein the seat portion includes a first seat portion positioned radially outward of the window portion and a pair of second seat portions positioned at circumferential opposite sides of the window portion.

10. The brushless motor of claim 1, wherein the base member includes an annular surface extending radially inward from a lower end of the wall portion and a first tapering surface extending radially inward and downward from a radial inner end of the annular surface, the armature being arranged on the annular surface with the adhesive agent interposed therebetween.

11. The brushless motor of claim 1, wherein the base member includes an annular surface extending radially inward from a lower end of the wall portion and a groove portion provided on the annular surface, the armature being arranged on the annular surface with the adhesive agent interposed therebetween.

12. The brushless motor of claim 1, wherein the armature includes a second tapering surface interconnecting a lower end of the outer edge portion of the armature and a radial outer edge portion of a lower surface of the armature.

13. The brushless motor of claim 1, wherein at least a portion of the adhesive agent makes contact with an upper surface of the armature.

14. The brushless motor of claim 1, wherein the sealing material is an insulating material.

15. The brushless motor of claim 1, wherein the sealing material is the same as the adhesive agent.

16. A disk drive apparatus, comprising:
   the brushless motor of claim 1;
   an access unit arranged to perform at least one of information reading and writing tasks with respect to a disk supported on the rotary unit of the brushless motor; and
   a cover making up a housing in cooperation with the base member, the rotary unit and the access unit being accommodated within the housing.

17. A method of manufacturing a brushless motor that includes: a flat armature extending in a direction orthogonal to a vertically-extending center axis; a base member including a wall portion radially opposed to an outer edge portion of the armature, an annular surface extending radially inward from a lower end of the wall portion and a tapering surface extending radially inward and downward from a radial inner end of the annular surface; and a magnetic rotor yoke positioned below the armature, the method comprising the steps of:
   (a) applying an adhesive agent on the wall portion or the outer edge portion of the armature; and
   (b) arranging the armature radially inward of the wall portion and above the annular surface.

18. The method of claim 17, wherein the base member includes a window portion positioned below the armature to axially extend through the base member and, in step (a), a sealing material is arranged on a whole periphery of an edge of the window portion or on a whole periphery of a portion of a lower surface of the armature positioned above the window portion.

19. A method of manufacturing a brushless motor that includes: a flat armature extending in a direction orthogonal to a vertically-extending center axis; a base member including a wall portion radially opposed to an outer edge portion of the armature, an annular surface extending radially inward from a lower end of the wall portion and a groove portion provided on the annular surface; and a magnetic rotor yoke positioned below the armature, the method comprising the steps of:
   (a) applying an adhesive agent on the wall portion or the outer edge portion of the armature; and
   (b) arranging the armature radially inward of the wall portion and above the annular surface.

20. The method of claim 19, wherein the base member includes a window portion positioned below the armature to axially extend through the base member and, in step (a), a sealing material is arranged on a whole periphery of an edge of the window portion or on a whole periphery of a portion of a lower surface of the armature positioned above the window portion.

* * * * *